US011873884B2

United States Patent
Maurel et al.

(10) Patent No.: US 11,873,884 B2
(45) Date of Patent: Jan. 16, 2024

(54) TORQUE TRANSMISSION DEVICE FOR A MOTOR VEHICLE

(71) Applicant: VALEO EMBRAYAGES, Amiens (FR)

(72) Inventors: Herve Maurel, Cergy Pontoise (FR); Norberto Termenon, Cergy Pontoise (FR); Camelia Jivan, Cergy Pontoise (FR); Thierry Guinot, Cergy Pontoise (FR); Jean-Christophe Pecoul, Cergy Pontoise (FR)

(73) Assignee: VALEO EMBRAYAGES, Amiens (FR)

( * ) Notice: Subject to any disclaimer, the term of this patent is extended or adjusted under 35 U.S.C. 154(b) by 105 days.

(21) Appl. No.: 17/433,143

(22) PCT Filed: Feb. 24, 2020

(86) PCT No.: PCT/EP2020/054796
§ 371 (c)(1),
(2) Date: Aug. 23, 2021

(87) PCT Pub. No.: WO2020/173887
PCT Pub. Date: Sep. 3, 2020

(65) Prior Publication Data
US 2022/0145965 A1    May 12, 2022

(30) Foreign Application Priority Data

Feb. 25, 2019  (FR) ...................................... 1901916

(51) Int. Cl.
*F16H 3/00*   (2006.01)
*F16H 61/00*  (2006.01)
*F16H 61/02*  (2006.01)

(52) U.S. Cl.
CPC ......... *F16H 3/006* (2013.01); *F16H 61/0025* (2013.01); *F16H 61/0206* (2013.01);
(Continued)

(58) Field of Classification Search
CPC .. F16H 3/006; F16H 61/0025; F16H 61/0206; F16H 2200/0021; F16H 2200/0034
(Continued)

(56) References Cited

U.S. PATENT DOCUMENTS 5,683,149 A * 11/1997 Aizawa ................. B60T 8/4275
                                                           303/113.5
9,772,016 B2 *  9/2017 Forsberg ................... F16H 3/16
(Continued)

FOREIGN PATENT DOCUMENTS

CN    101886697 A    11/2010
CN    107202081 A     9/2017
(Continued)

OTHER PUBLICATIONS

International Search Report dated Apr. 3, 2020 in PCT/EP2020/054796 filed Feb. 24, 2020, citing documents AA-AD and AO-AQ therein, 2 pages.

*Primary Examiner* — Ha Dinh Ho
(74) *Attorney, Agent, or Firm* — Oblon, McClelland, Maier & Neustadt, L.L.P.

(57) ABSTRACT

A torque transmission device for a vehicle including at least one motor, the torque transmission device including a first clutch, a second clutch and a transmission member. A first transmission mechanism is provided between the first clutch and the transmission member, and a second transmission mechanism is provided between the second clutch and the transmission member. A connection element arranged to permit or interrupt the mutual rotational drive between the first output element of the first clutch and the transmission member, by means of the first transmission mechanism.

18 Claims, 7 Drawing Sheets

(52) U.S. Cl.
CPC ............... *F16H 2200/0021* (2013.01); *F16H 2200/0034* (2013.01)

(58) Field of Classification Search
USPC .......................................... 74/330, 331, 335
See application file for complete search history.

(56) References Cited

U.S. PATENT DOCUMENTS

| | | | |
|---|---|---|---|
| 2006/0048594 A1* | 3/2006 | Gumpoltsberger | F16H 3/006 74/331 |
| 2006/0117882 A1* | 6/2006 | Gitt | F16H 3/097 74/331 |
| 2010/0243402 A1* | 9/2010 | Momal | F16H 61/0206 192/85.63 |
| 2010/0288064 A1 | 11/2010 | Singh et al. | |
| 2011/0030506 A1 | 2/2011 | Singh et al. | |
| 2013/0239715 A1 | 9/2013 | Singh et al. | |
| 2013/0269460 A1 | 10/2013 | Singh et al. | |
| 2015/0226295 A1 | 8/2015 | Forsberg | |

FOREIGN PATENT DOCUMENTS

| | | |
|---|---|---|
| FR | 2 803 355 A1 | 7/2001 |
| FR | 2 945 599 A1 | 11/2010 |
| FR | 2 948 984 A1 | 2/2011 |
| GB | 2468867 A | 9/2010 |

* cited by examiner

TORQUE TRANSMISSION DEVICE FOR A MOTOR VEHICLE

TECHNICAL FIELD OF THE INVENTION

The invention relates to a torque transmission device for an electric or hybrid vehicle, particularly for an electric or hybrid motor vehicle.

PRIOR ART

The invention applies more particularly to hybrid vehicles and to electric vehicles. The speed of an electric motor can be high, greater than or equal to 15,000 revolutions per minute for example, particularly for two-speed electric transmission lines.

To adjust the speed and the torque, the use of electric motors generally requires a transmission including a speed reduction device that makes it possible to achieve the desired speed and torque output levels at each wheel, and a differential to vary the speed between two laterally opposite wheels.

To adapt to the different vehicle speeds, it is known to use clutches that make it possible to select the desired reduction ratio on the speed reduction device. Such a device is disclosed in DE102016202723, for example.

This device is unsatisfactory in terms of efficiency, as drag torque occurs on one of the clutches, which is open when the other clutch is closed. This drag torque is particularly detrimental when the clutches are wet.

In addition, the clutches of this device transmit relatively high torque, which means that the clutches must be a considerable size and weight, and therefore results in a large footprint linked to the clutches.

DISCLOSURE OF THE INVENTION

To that end, the invention relates to a torque transmission device for a vehicle comprising at least one motor, the torque transmission device comprising:
- a first clutch comprising a first input element capable of being driven by the motor, and a first output element, torque being transmitted between the first input element and the first output element when the first clutch is closed,
- a second clutch comprising a second input element capable of being driven by the motor, and a second output element, torque being transmitted between the second input element and the second output element when the second clutch is closed,
- a transmission member,
- a first transmission mechanism arranged to transmit torque between the first output element and the transmission member, according to a first gear ratio,
- a second transmission mechanism arranged to transmit torque between the second output element and the transmission member, according to a second gear ratio different from the first gear ratio,
- a connection element arranged to permit or interrupt the mutual rotational drive between the first output element of the first clutch and the transmission member, by means of the first transmission mechanism.

Gear ratio is given to mean the ratio between the speed at the output of the transmission mechanism and the speed at the input of the transmission mechanism.

The use of at least two gear ratios makes it possible to reconcile high starting torque and maximum speed and consequently to reduce the time necessary for the vehicle to reach a high speed.

Preferably, the motor is an electric motor, also referred to as an electric machine.

Preferably, the electric machine is capable of driving the vehicle and generating electricity.

The use of the clutches, particularly progressive multi-disk clutches, also makes it possible to ensure user comfort by avoiding sudden gear changes, together with perceptible changes in acceleration.

In addition, the connection element makes it possible to interrupt the driving of the output element of the first clutch, and particularly the output friction disks of the first clutch, when the second clutch is closed. This makes it possible to significantly limit, or even eliminate, the drag torque in the first clutch when the second clutch is closed, which makes it possible to improve the energy efficiency.

In addition, when the first transmission mechanism is a speed reducer with a low gear ratio and/or when the ratio between the reduction ratio of the second transmission mechanism and the reduction ratio of the first transmission mechanism (also referred to as the opening ratio of the gearbox) is high, for example between 1.3 and 2, and all the more so when the first and second input elements of the clutches are driven directly, without an intermediate reduction gear, by an electric motor that can rotate at up to 15,000 revolutions per minute, the opening of the connection element makes it possible to avoid excessive spinning of the first output element of the first clutch, which could rotate at a higher speed than the motor (the speed of which is already very high) when the second clutch is closed and the first clutch is open. In fact, the first transmission mechanism would act as a speed multiplier in relation to the first output element of the first clutch when the torque is transmitted by the second clutch.

The invention therefore makes it possible to improve the safety of the torque transmission device. For example, with an electric motor rotating at 15,000 revolutions per minute and an opening ratio of 2 between the first and second transmission mechanisms, the first output element of the first clutch could for example rotate at 30,000 revolutions per minute in the absence of a connection element arranged to interrupt the drive between the first output element and the transmission member. This rotating speed of the first output element is likely to create problems relating to mechanical strength and could generate malfunctions in the first clutch.

The vehicle can be a two-wheel drive or a four-wheel drive vehicle. The torque transmission device can operate with one or two electric motors for example. If two electric motors are used, each electric motor could for example be coupled to two wheels of the vehicle, by means of the clutches and the corresponding torque transmission device.

The transmission device can further include one or more of the features below:

The transmission device is a two-speed transmission device. In other words, the transmission device comprises exactly two gear ratios.

The first gear ratio is the slowest gear ratio of the torque transmission device.

The first transmission mechanism is configured to propel the vehicle in the starting phases.

In other words, the transmission path passes through the first transmission mechanism when the vehicle is starting.

The second gear ratio is the fastest gear ratio of the torque transmission device.

The choice of two gear ratios with an electric motor offers a good compromise between the complexity of the transmission, the dynamic performance, the consumption of the vehicle, and the size of the electric motor.

The first clutch and the second clutch are wet multi-disk clutches.

The connection element (6) is arranged to interact solely with the first transmission mechanism associated with the first gear ratio.

The connection element is arranged to permit the mutual rotational drive between the first output element of the first clutch and the transmission member, by means of the first transmission mechanism, when the first clutch is closed, and to interrupt the mutual rotational drive between the first output element of the first clutch and the transmission member, by means of the first transmission mechanism, when the first clutch is open.

The connection element is arranged so as to permit or interrupt the mutual drive between the transmission member and the first transmission mechanism.

This thus also avoids detrimental losses of efficiency in the first transmission mechanism, linked in particular to splash lubrication by the oil.

According to another embodiment, not shown, the connection element is arranged so as to permit or interrupt the mutual drive between the first output element of the first clutch and the first transmission mechanism.

The first transmission mechanism comprises a gear train.

The second transmission mechanism comprises a gear train.

The first transmission mechanism is a reduction gear and the first transmission mechanism has a lower gear ratio than the second transmission mechanism.

Reduction gear is given to mean a speed reducer.

The second transmission mechanism is a reduction gear.

The first input element and the second input element are arranged to be driven by a common torque input shaft.

The first transmission mechanism comprises a speed-reduction gear train, for example with fixed parallel axes.

The second transmission mechanism comprises a speed-reduction gear train, for example with fixed parallel axes.

The first transmission mechanism operates in a wet environment comprising oil. The first transmission mechanism can be braked by a splashing phenomenon when it is rotated.

The first transmission mechanism comprises a first input shaft.

The second transmission mechanism comprises a second input shaft.

At least one of the first input shaft and the second input shaft is a hollow shaft and the other of the first input shaft and the second input shaft extends inside the hollow shaft.

The first input shaft and the second input shaft are coaxial.

The first input shaft is rigidly connected to a first toothed input wheel for rotation therewith.

The second input shaft is rigidly connected to a second toothed input wheel for rotation therewith.

A first toothed output wheel meshes directly or indirectly (via one or more intermediate toothed wheels) with the first toothed input wheel.

A second toothed output wheel meshes directly or indirectly (via one or more intermediate toothed wheels) with the second toothed input wheel.

According to another embodiment, the first transmission mechanism and the second transmission mechanism are situated between the motor and the first and second clutches.

At least one of the first input shaft and the second input shaft is a hollow shaft and the common torque input shaft extends inside the hollow shaft.

The first input shaft can be formed in one piece with the first toothed wheel.

The second input shaft can be formed in one piece with the second toothed wheel.

The second toothed output wheel is rigidly connected to the transmission member for rotation therewith, for example via splines.

The first toothed output wheel can be rigidly connected to the transmission member for rotation therewith, by means of the connection element.

The first toothed output wheel is rotatably mounted on a portion of the transmission member, for example via a roller or needle bearing.

The first toothed output wheel can be rotatably coupled to another portion of the transmission member, via the connection element.

The first transmission mechanism has a gear ratio of between 0.2 and 1 and the second transmission mechanism has a gear ratio of between 0.25 and 1.5.

The transmission device comprises an actuator capable of switching the connection element from a first operating mode in which the first toothed output wheel is rigidly connected to the transmission member for rotation therewith to a second operating mode in which the first toothed output wheel is able to rotate relative to the transmission member.

The connection element is of the normally open type. In other words, the connection element is closed in the first operating mode of the connection element and the connection element is open in the second operating mode of the connection element.

The connection element is pneumatically or hydraulically controlled.

The connection element is a synchronizer.

The synchronizer comprises a hub rigidly connected to the transmission member for rotation therewith.

The synchronizer comprises a synchronizing ring forming a cone friction clutch with the first toothed output wheel.

The synchronizer comprises a sliding sleeve rigidly connected to keys for rotation therewith, which in turn are rigidly connected to the hub for rotation therewith.

The keys can slide axially relative to the hub. The sliding sleeve can also slide axially relative to the hub, driving the keys axially.

The keys are arranged to rub against the synchronizing ring.

The sliding sleeve comprises teeth and the second output wheel comprises complementary teeth capable of interacting with the teeth of the sliding sleeve, to drive the sliding sleeve (and therefore the transmission member) and the second output wheel at the same speed in the first operating mode.

The cone friction clutch allows a progressive speed change between the second operating mode and the first operating mode of the synchronizer.

Friction occurs between the first toothed output wheel and the synchronizing ring as long as the speeds of the first toothed output wheel and the transmission member are not equal.

According to another embodiment, the connection element is switched centrifugally. When a predetermined speed threshold of the transmission member is reached, the connection element is thus switched to interrupt drive. Switching can be obtained by means of an elastic return member the action of which is offset by the centrifugal forces when said speed threshold is reached.

The first clutch is a progressive friction clutch.

The second clutch is a progressive friction clutch.

Progressive clutch is given to mean a clutch the transmissible torque of which can be controlled progressively.

The first clutch and the second clutch jointly form a dual clutch.

The first input element and the second input element jointly form an input member of the dual clutch.

The first input element and the second input element have a portion for coupling to the common input shaft.

The first input element and the second input element can be formed in one piece.

The first input element is coupled to at least one input friction disk.

The first clutch comprises a first output element mounted so that it is rigidly connected to the first input shaft for rotation therewith, for example by splines.

The first clutch comprises at least one output friction disk rotatably coupled to the first output element, said at least one input friction disk and said at least one output friction disk being capable of being pressed against each other in order to transmit torque between the first input element and the first output element.

The second input element is coupled to at least one input friction disk.

The second clutch comprises a second output element mounted so that it is rigidly connected to the second input shaft for rotation therewith, for example by splines.

The second clutch comprises at least one output friction disk rotatably coupled to the second output element, said at least one input friction disk and said at least one output friction disk being capable of being pressed against each other in order to transmit torque between the second input element and the second output element.

The first clutch comprises a multi-disk assembly made up of a plurality of input disks and a plurality of output disks in alternate succession.

The second clutch comprises a multi-disk assembly made up of a plurality of input disks and a plurality of output disks in alternate succession.

The multi-disk assembly of one of the first clutch and the second clutch is situated radially inside the multi-disk assembly of the other of the first clutch and the second clutch, preferably with radial overlap.

The first clutch is a wet clutch.

The second clutch is a wet clutch.

The first clutch is pneumatically or hydraulically controlled.

The second clutch is pneumatically or hydraulically controlled.

The first clutch is of the normally open type.

The second clutch is of the normally open type.

The first clutch and the second clutch are coaxial.

The transmission member comprises a transmission shaft.

The transmission member is a transmission shaft.

The torque transmission device comprises a common reduction gear configured so that an input of the common reduction gear is capable of being driven by the motor and so that an output of the common reduction gear is rigidly connected to the first input element of the first clutch and to the second input element of the second clutch for rotation therewith.

As a variant or in combination, the torque transmission device can comprise a common reduction gear configured so that an input of the common reduction gear is rigidly connected to the transmission member for rotation therewith and an output thereof is capable of directly or indirectly rotating the differential.

Such reduction gears are known as "common reduction gears" because regardless of the path taken by the torque, namely via the first clutch and the first transmission mechanism or via the second clutch and the second transmission mechanism, the torque passes through this reduction gear, which makes it possible to reduce the drive speed.

In the second scenario the input of the common reduction gear can be a toothed wheel in one piece with the transmission shaft.

The invention also relates to a torque transmission assembly comprising a device as described above and further comprising a differential, the torque transmission device comprising an output member capable of rotating the differential.

The transmission device of the transmission assembly can comprise at least one of the preceding features and the torque transmission assembly can comprise at least one of the features below:

Another speed reduction mechanism can be formed by the output member and the differential.

The transmission assembly further comprises a parking brake mechanism including a toothed locking wheel mounted for conjoint rotation on the transmission member or on the differential or on a portion of the transmission device situated kinematically between the transmission member and the differential, the toothed locking wheel being associated with a controlled locking lever that can move between a locking position in which it is engaged in the teeth of the toothed locking wheel so as to prevent the differential from being rotated, and a released position in which it is disengaged from the teeth of the toothed locking wheel so as to allow the differential to be rotated.

The speed reduction mechanism is formed by the output member and the differential.

The invention also relates to a torque transmission system comprising a torque transmission device or a transmission assembly as described above and said at least one motor of the vehicle, the common torque input shaft being the output shaft of the motor. The clutches are thus kinematically placed as close as possible to the motor, before the reduction devices, which means that the two clutches are placed in a portion of the transmission line where the torque is lowest. In the case of progressive friction clutches particularly, this allows improved compactness of the clutches.

The invention also relates to a method for actuating a vehicle torque transmission device as described above, the torque transmission device comprising a first transmission mechanism driven by a first output element of a first clutch of the normally open type, a second transmission mechanism driven by a second clutch of the normally open type, a transmission member arranged to be driven by the first transmission mechanism or the second transmission mechanism, and a connection element capable of interrupting the mutual rotational drive between the first output element of the first clutch and the transmission member, the connection element being of the normally open type, in which the method comprises the following successive steps in a speed increase phase of the vehicle:

closing the first clutch and opening the second clutch in order to transmit torque via the first transmission mechanism having a first gear ratio, and closing the connection element, keeping the first clutch closed and keeping the second clutch open in order to transmit torque via the first transmission mechanism having the first gear ratio, and keeping the connection element closed, progressively opening the first clutch and progressively closing the second clutch in order to transmit torque via the second transmission mechanism having a second gear ratio, opening the connection element in order to prevent the driving of the first output element of the first clutch by the transmission member, keeping the first clutch open and keeping the second clutch closed in order to transmit torque via the second transmission mechanism having the second gear ratio, while keeping the connection element open.

The connection element of the normally open type means that the mutual rotational drive is interrupted when the connection element is open and the mutual rotational drive is permitted when the connection element is closed.

The actuation method can further comprise the following successive steps in a deceleration phase of the vehicle:

closing the connection element in order to permit the driving of the first output element of the first clutch by the transmission member, progressively opening the second clutch and progressively closing the first clutch in order to transmit torque via the first transmission mechanism having the first gear ratio, keeping the first clutch closed and keeping the second clutch open in order to transmit torque via the first transmission mechanism having the first gear ratio, while keeping the connection element closed.

In other words, when the first clutch is closed, the connection element is necessarily closed.

The actuation method can further comprise the following step in a phase of placing the torque transmission device in a safety mode:

opening the first clutch, the second clutch and the connection element.

The invention also relates to an actuation device for implementing the method as described above, the actuation device comprising:

a pump with two outputs driven by a pump motor, a first circuit for supplying actuation fluid to a first clutch of the normally open type of a transmission device, so as to actuate the first clutch, a second circuit for supplying actuation fluid to a second clutch of the normally open type of the transmission device, so as to actuate the second clutch, a third circuit for supplying actuation fluid to a connection element of the normally open type, so as to open the connection element when the first clutch is open, the third circuit and the first circuit being connected to one of the two outputs of the pump and the second circuit being connected to the other of the two outputs of the pump.

The connection element of the normally open type means that the connection (or drive) is interrupted when the connection element is open and the connection (or drive) is permitted when the connection element is closed.

The transmission device can comprise at least one of the preceding features and at least one of the features below:

The connection element is preferably arranged on a transmission sub-assembly connecting a first output element of the first clutch and a second output element of the second clutch.

The invention also relates to an assembly comprising the torque transmission device and the actuation device described above.

DETAILED DESCRIPTION OF THE INVENTION

In the description and the claims, the terms "outer" and "inner" and the orientations "axial" and "radial" will be used to denote elements of the transmission device according to the definitions given in the description. By convention, the "radial" orientation is orthogonal to the axial orientation. The axial orientation relates, depending on the context, to the axis of rotation of one of the shafts, for example the output shaft of the motor or the transmission shaft 5. The "circumferential" orientation is orthogonal to the axis of rotation of the transmission device and orthogonal to the radial direction. The terms "outer" and "inner" are used to define the position of one element relative to another, in relation to the reference axis; an element near the axis is thus described as inner as opposed to an outer element situated radially peripherally.

The different members of the transmission device each have a torque input also referred to as an input element, and a torque output also referred to as an output element. The input is situated, from a kinematic point of view, on the motor side, and the output is situated on the side of the wheels of the vehicle.

Figure 1:
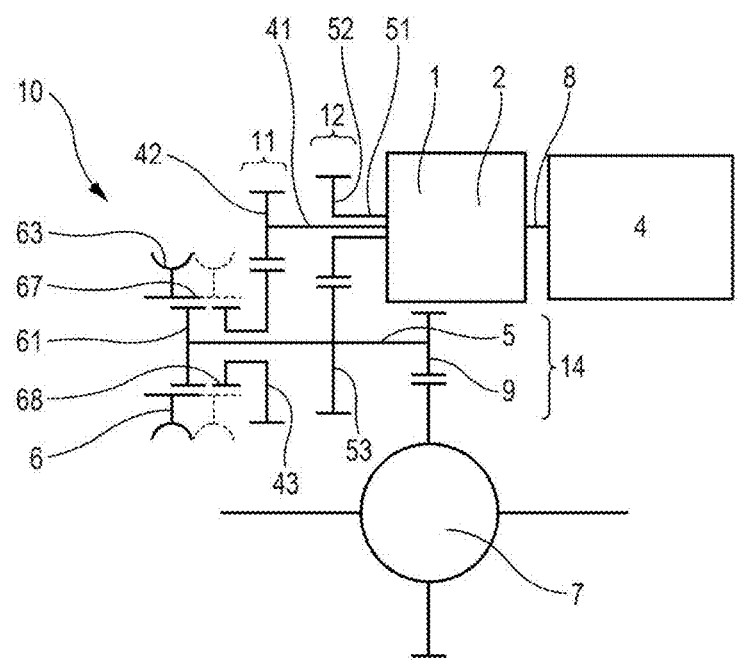
FIG. 1 is a block diagram of a torque transmission system according to a first embodiment of the invention.

FIG. 1 is a block diagram illustrating a first embodiment of the invention. FIG. 1 illustrates a torque transmission system comprising an electric motor 4 of a vehicle capable of propelling the vehicle, and a torque transmission assembly.

The torque transmission assembly includes a transmission device 10 and a differential 7 capable of driving two laterally opposite wheels of the vehicle. The torque transmission device 10 comprises an output member 9 coupled to the differential 7.

The torque transmission device 10 includes:

a first clutch 1 comprising a first input element capable of being driven by the motor 4, and a first output element, torque being transmitted between the first input element and the first output element when the first clutch is closed, a second clutch 2 comprising a second input element capable of being driven by the motor, and a second output element, torque being transmitted between the second input element and the second output element when the second clutch is closed, a transmission member 5, which can be a transmission shaft 5, a first transmission mechanism 11 arranged to transmit torque between the first output element and the transmission member 5, according to a first gear ratio, a second transmission mechanism 12 arranged to transmit torque between the second output element and the transmission member 5, according to a second gear ratio different from the first gear ratio, a connection element 6 arranged to permit or interrupt the mutual rotational drive between the first output element of the first clutch 1 and the transmission member 5, by means of the first transmission mechanism 11.

Gear ratio is given to mean the ratio between the speed at the output of the transmission mechanism and the speed at the input of the transmission mechanism.

In this case, the transmission member is a transmission shaft 5.

The first input element of the first clutch 1 and the second input element of the second clutch 2 are arranged to be driven by a common torque input shaft 8, which in this case is the output shaft of the motor 4. The clutches 1 and 2 are thus kinematically placed as close as possible to the motor 4, before the reduction devices, which means that the two clutches are placed in a portion of the transmission line where the torque is lowest. In the case of progressive friction clutches particularly, this allows improved compactness of the clutches.

To increase the torque and reduce the rotating speed at the output of the torque transmission device, a speed-reduction mechanism is formed in this case by the output member 9 and the differential 7 by means of a pinion 7 forming the output member 9 and a toothed wheel arranged at the input of the differential, the toothed wheel meshing with the pinion 9.

The connection element 6 is arranged to permit the mutual rotational drive between the first output element of the first clutch 1 and the transmission member 5, by means of the first transmission mechanism 11, when the first clutch 1 is closed, and to interrupt the mutual rotational drive between the first output element of the first clutch 1 and the transmission member 5, by means of the first transmission mechanism 11, when the first clutch is open.

Preferably, the connection element is arranged so as to permit or interrupt the mutual drive directly between the transmission member 5 and the first transmission mechanism 11. By avoiding driving the first transmission mechanism unnecessarily, detrimental losses of efficiency are avoided in the first transmission mechanism, which losses could be linked in particular to the splash lubrication of the rotating transmission elements.

The first transmission mechanism 11 is a speed-reduction gear train (from the motor to the differential). The second transmission mechanism 12 is also a speed-reduction gear train.

These gear trains can be mounted so that they are splash lubricated by the oil. The first transmission mechanism 11 has a lower gear ratio than the second transmission mechanism 12. The first transmission mechanism is used to propel the vehicle at relatively low speeds, and the second transmission mechanism is used to propel the vehicle at relatively high speeds.

The first transmission mechanism 11 comprises a first input shaft 41 rigidly connected to a first toothed input wheel 42 or pinion 42 for rotation therewith, a toothed output wheel 43 meshing in this case directly with the first toothed input wheel 42.

The second transmission mechanism 12 comprises a second input shaft 51 rigidly connected to a second toothed input wheel 52 or pinion 52 for rotation therewith, a second toothed output wheel 53 meshing in this case directly with the second toothed input wheel 52.

The second input shaft is a hollow shaft 51 and the first input shaft 41 extends inside this hollow shaft 51. The second input shaft 51 and the first input shaft 41 are coaxial.

Figure 3:
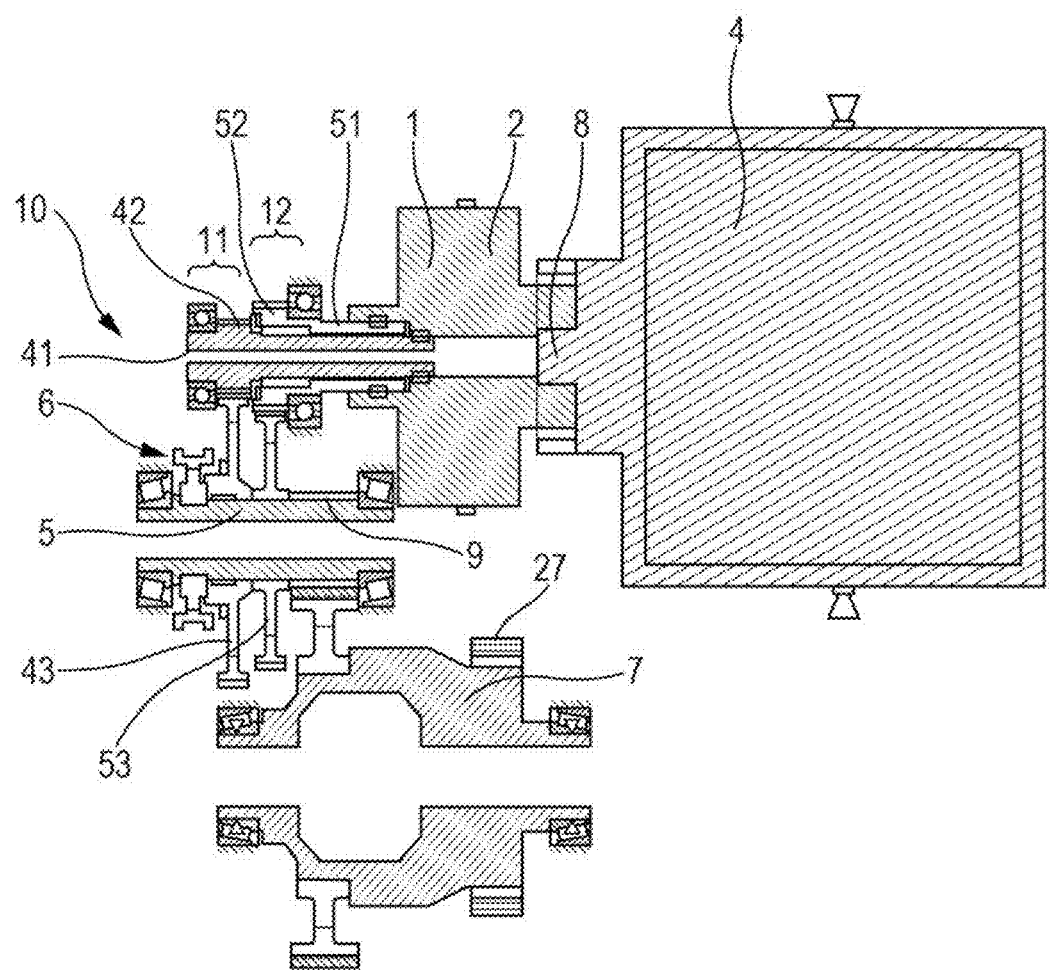
FIG. 3 is a schematic cross-sectional view of the torque transmission system according to the first embodiment of the invention.

As can be seen in the diagram in FIG. 3, the first input shaft 41 can be formed in one piece with the pinion 42. Likewise, the second input shaft 51 can be formed in one piece with the pinion 52.

The second toothed output wheel 53 is rigidly connected to the transmission member 5 for rotation therewith, for example via splines. The first toothed output wheel 43 can be rigidly connected to the transmission member 5 for rotation therewith, by means of the connection element 6. In addition, the first toothed output wheel 43 is rotatably mounted on a portion of the transmission member 5, for example via a roller or needle bearing. Another portion of the transmission member 5 makes it possible to couple the transmission member 5 and the first toothed output wheel 43 via the connection element 6.

The transmission device further comprises an actuator capable of switching the connection element 6 from a first operating mode in which the first toothed output wheel 43 is rigidly connected to the transmission member 5 for rotation therewith to a second operating mode in which the first toothed output wheel 43 is able to rotate relative to the transmission member 5.

The connection element 6 is preferably of the normally open type. In other words, the connection element 6 is closed in the first operating mode of the connection element and the connection element 6 is open in the second operating mode of the connection element. As will be seen below, the connection element 6 can be hydraulically controlled.

Figure 6:
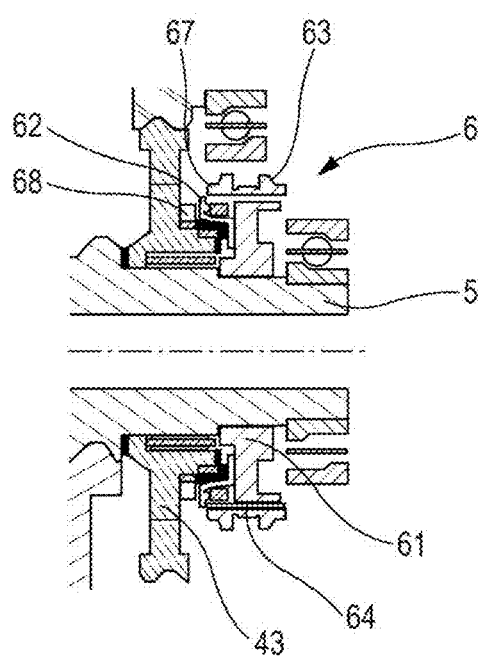
FIG. 6 is an enlarged cross-sectional view of the connection element of the third embodiment.

Preferably, the connection element is a synchronizer 6. Such a synchronizer is shown in FIG. 6. A synchronizer is a device known to a person skilled in the art. FIG. 6 shows the synchronizer of the third embodiment but it can also be used for the first and second embodiments.

The synchronizer 6 comprises a hub 61 rigidly connected to the transmission shaft 5 for rotation therewith.

The synchronizer 6 comprises a synchronizing ring 62 forming a cone friction clutch with the first toothed output wheel 43. The synchronizer 6 further comprises a sliding sleeve 63 rigidly connected to keys 64 for rotation therewith, which in turn are rigidly connected to the hub 61 for rotation therewith. The keys 64 can slide axially relative to the hub 61. The sliding sleeve 63 can also slide axially relative to the hub 61, axially driving the keys 64. The keys 64 are arranged to rub against the synchronizing ring 62. The sliding sleeve 63 comprises teeth 67 and the second output wheel 43 comprises complementary teeth 68 capable of interacting with the teeth 67 of the sliding sleeve 63, to drive the sliding sleeve 63 (and therefore the transmission member 5) and the second output wheel 43 at the same speed in the first operating mode.

The cone friction clutch allows a progressive speed change between the second operating mode and the first operating mode of the synchronizer.

Friction occurs between the first toothed output wheel 43 and the synchronizing ring 62 as long as the speeds of the first toothed output wheel 43 and the transmission member 5 are not equal.

The hydraulic actuator makes it possible to move the sliding sleeve in order to switch the connection element 5.

According to another embodiment, not shown, the connection element is switched centrifugally. When a predetermined speed threshold is reached, the connection element is thus switched to interrupt drive. Switching can be obtained by means of an elastic return member the action of which is offset by the centrifugal forces when said speed threshold is reached.

The first clutch 1 is a progressive friction clutch and the second clutch is a progressive friction clutch. The gear changes can thus be smooth and progressive without sudden accelerations. Progressive clutch is given to mean a clutch the transmissible torque of which can be controlled progressively.

Figure 4:
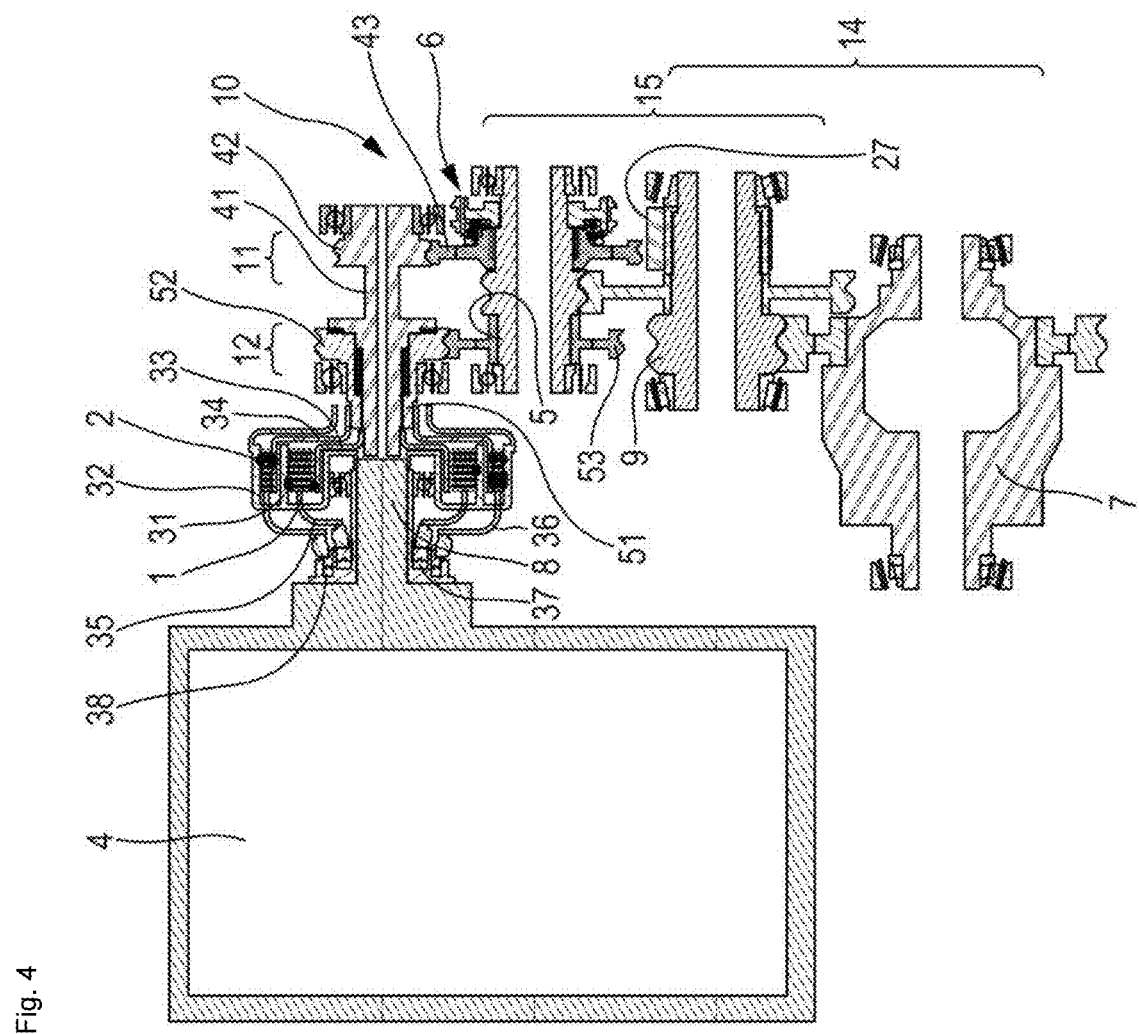
FIG. 4 is a cross-sectional view of a torque transmission system according to a third embodiment.
Figure 5:
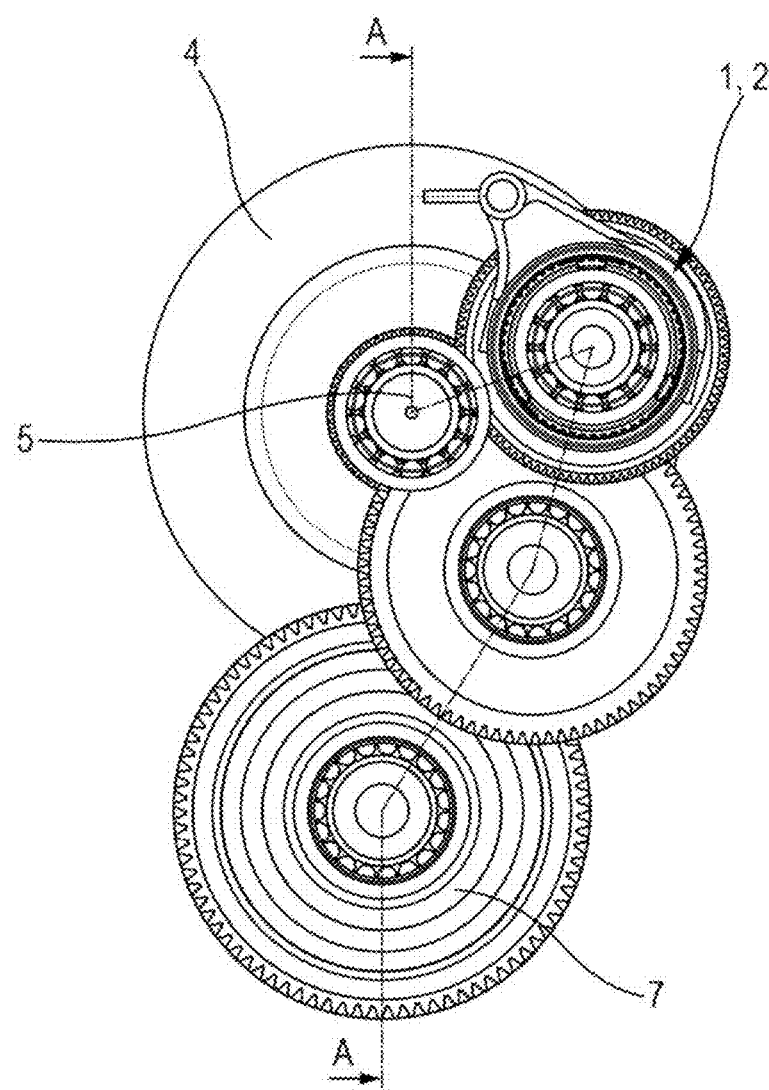
FIG. 5 is a side view of a torque transmission system according the third embodiment.

As can be seen in the embodiment in FIG. 4, the first clutch 1 and the second clutch 2 can jointly form a dual clutch. The first input element and the second input element jointly form an input member of the dual clutch. The first input element 31 and the second input element 32 have a portion for coupling to the common input shaft 8. The first input element 31 and the second input element 32 can be formed in one piece. The first clutch 1 and the second clutch 2 are coaxial.

The first input element 31 has a portion forming a disk carrier coupled to at least one input friction disk. The first clutch 1 comprises a first output element 33 mounted so that it is rigidly connected to the first input shaft 41 for rotation therewith, for example by splines. The first clutch 1 comprises at least one output friction disk rotatably coupled to the first output element 33, said at least one input friction disk and said at least one output friction disk being capable of being pressed against each other by a piston 35 in order to transmit torque between the first input element 31 and the first output element 33. A hydraulic actuator 37 makes it possible to move the piston in order to switch the first clutch 1 from a disengaged position to an engaged position.

Likewise, the second input element 32 has a portion forming a disk carrier coupled to at least one input friction disk. The second clutch 2 comprises a second output element 34 mounted so that it is rigidly connected to the second input shaft 51 for rotation therewith, for example by splines. The second clutch 2 comprises at least one output friction disk rotatably coupled to the second output element 34, said at least one input friction disk and said at least one output friction disk being capable of being pressed against each other by a piston 36 in order to transmit torque between the second input element 32 and the second output element 34. A hydraulic actuator 38 makes it possible to move the piston in order to switch the second clutch 2 from a disengaged position to an engaged position. The actuators 37, 38 can be coaxial and radially superposed, and produced in the form of a dual actuator. The first clutch and the second clutch are therefore hydraulically controlled. The first clutch and the second clutch are preferably of the normally open type.

The first clutch 1 comprises a multi-disk assembly made up of a plurality of input disks and a plurality of output disks in alternate succession. Likewise, the second clutch 2 comprises a multi-disk assembly made up of a plurality of input disks and a plurality of output disks in alternate succession. The multi-disk assembly of the first clutch 1 is situated radially inside the multi-disk assembly of second clutch 2 with radial overlap. The first clutch and the second clutch are wet clutches.

In each embodiment, the torque transmission device comprises a common reduction gear loaded regardless of the path taken by the drive torque (through the first transmission mechanism or through the second transmission mechanism).

In the first embodiment shown schematically in FIG. 1, there is a common reduction gear 14 arranged between the output pinion 9 of the transmission device and a toothed wheel coupled to the differential 7.

Figure 2:
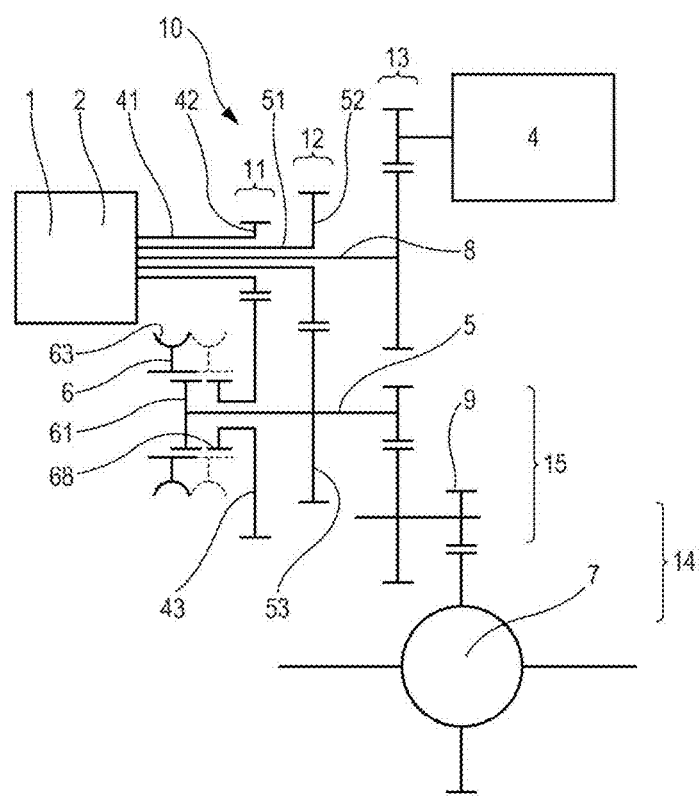
FIG. 2 is a block diagram of a torque transmission system according to a second embodiment of the invention.

In the second embodiment shown schematically in FIG. 2, there is a first common reduction gear 13 arranged kinematically between the motor 4 and the dual clutch 1, 2. This common reduction gear is formed by a gear train. A second two-stage common reduction gear 15, 14 is also formed by a gear train between the transmission member 5 and the differential 7.

In the third embodiment shown in FIG. 4, there is a two-stage common reduction gear 15, 14 also formed by a gear train between the transmission member 5 and the differential 7.

In addition to these differences, the second embodiment in FIG. 2 is distinguished in that the first transmission mechanism 11 and the second transmission mechanism 12 are situated between the motor 4 and the first and second clutches 1, 2. In addition, the second input shaft 51 is a hollow shaft and the common torque input shaft 8 extends inside the hollow shaft 51. The three shafts 8, 51 and 41 are thus arranged inside each other, the common input shaft 8 extending inside the second input shaft 51, which extends inside the first input shaft 41. The footprint is thus limited.

In the first embodiment shown schematically in FIG. 3 and in the third embodiment shown in FIG. 4, the torque transmission assembly further comprises a parking brake mechanism including a toothed locking wheel 27 mounted for conjoint rotation on the differential 7 (FIG. 3) or on a portion of the transmission device situated kinematically between the transmission member 5 and the differential 7 (FIG. 4). The toothed locking wheel is associated with a controlled locking lever (not shown) that can move between a locking position in which it is engaged in the teeth of the toothed locking wheel so as to prevent the differential from being rotated, and a released position in which it is disengaged from the teeth of the toothed locking wheel (27) so as to allow the differential to be rotated. The toothed locking wheel could also be mounted on the transmission member 5.

Figure 7:
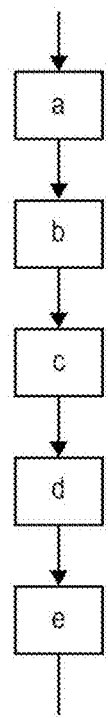
FIG. 7 is a block diagram of the method for actuating the device.
Figure 8:
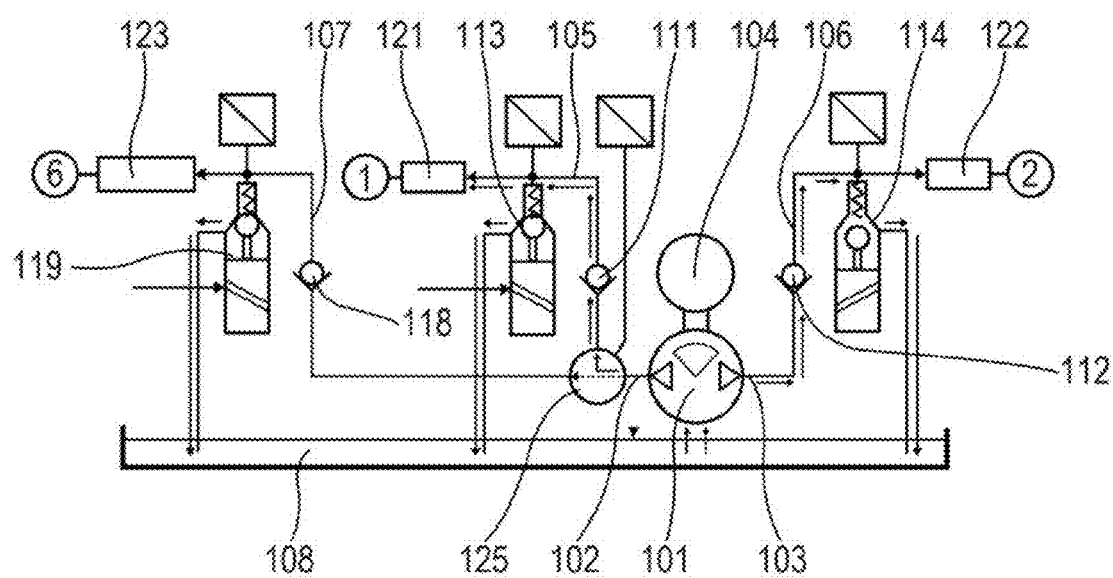
FIG. 8 is a block diagram of the actuation device.

FIG. 7 illustrates a sequence of steps of an actuation method when the vehicle accelerates and switches from the first gear ratio to the second gear ratio.

This actuation method comprises the following successive steps:
- a: closing the first clutch 1 and opening the second clutch 2 in order to transmit torque via the first transmission mechanism 11 having a first gear ratio, and closing the connection element 6,
- b: keeping the first clutch 1 closed and keeping the second clutch 2 open in order to transmit torque via the first transmission mechanism 1 having the first gear ratio, and keeping the connection element 6 closed,
- c: progressively opening the first clutch 1 and progressively closing the second clutch 2 in order to transmit torque via the second transmission mechanism 12 having a second gear ratio,
- d: opening the connection element 6 in order to prevent the driving of the first output element 33 of the first clutch 1 by the transmission member 5,
- e: keeping the first clutch 1 open and keeping the second clutch 2 closed in order to transmit torque via the second transmission mechanism 12 having the second gear ratio, while keeping the connection element 6 open.

The connection element 6 of the normally open type means that the mutual rotational drive is interrupted when the connection element is open and the mutual rotational drive is permitted when the connection element is closed.

The actuation method further comprises the following successive steps in a deceleration phase of the vehicle, when the vehicle switches from the second gear ratio to the first gear ratio:
- closing the connection element 6 in order to permit the driving of the first output element 33 of the first clutch 1 by the transmission member 5,
- progressively opening the second clutch 2 and progressively closing the first clutch 1 in order to transmit torque via the first transmission mechanism 11 having the first gear ratio,
- keeping the first clutch 1 closed and keeping the second clutch 2 open in order to transmit torque via the first transmission mechanism 11 having the first gear ratio, while keeping the connection element 6 closed.

In other words, when the first clutch 1 is closed, the connection element 6 is necessarily closed.

In a phase of placing the torque transmission device in a safety mode, the method further comprises a step intended to open the first clutch 1, the second clutch 2 and the connection element 6.

In order to implement this method, an actuation device comprises:
- a pump 101 with two outputs 102, 103 driven by a pump motor 104,
- a first circuit 105 for supplying actuation fluid to a first clutch 1 of the normally open type of the transmission device 10, so as to actuate the first clutch 1,
- a second circuit 106 for supplying actuation fluid to a second clutch 2 of the normally open type of the transmission device 10, so as to actuate the second clutch 2,
- a third circuit 107 for supplying actuation fluid to the connection element 6 of the normally open type, so as to open the connection element 6 when the first clutch 1 is open.

The third circuit 107 and the first circuit are connected to the same output of 102 of the pump 101 and the second circuit is connected to the other output 103 of the pump 101. The connection element 6 of the normally open type means that the connection (or drive) is interrupted when the connection element 6 is open and the connection (or drive) is permitted when the connection element 6 is closed.

The actuation device also comprises a tank 108 of actuation fluid, for example hydraulic fluid. The fluid can be conveyed from the tank 108 to the three circuits 105, 106, 107 by the pump 101.

Starting from the pump 101, each of the first and second circuits 105, 106 comprises:
- a non-return valve 111, 112 preventing the fluid from going towards the pump,
- a proportional flow control valve 113, 114 that is connected to the tank 108 and can be electromagnetically actuated,
- a hydraulic clutch receiver 121, 122 connected to the first and second clutches 1 and 2.

Each of the first and second circuits further comprises a pressure sensor.

Likewise, starting from the pump 101, the third circuit 107 comprises:
- a non-return valve 118 preventing the fluid from going towards the pump,
- a proportional flow control valve 119 that is connected to the tank 108 and can be electromagnetically actuated,
- a hydraulic receiver 123 connected to the connection element 6.

The third circuit 107 further comprises a pressure sensor.

An electronic control unit (not shown) can coordinate the activation of the pump motor 104 and the flow control valves 113, 114, 119.

The actuation device can also comprise other arrangements, such as devices for cooling the clutches, as described in U.S. Pat. No. 8,939,268.

The proportional flow control valves 113, 114, 119 are preferably no-leak valves.

A hydraulic spool valve 125 joins the first circuit 105 and the third circuit 107 to the output of the pump 102. This hydraulic spool valve can be activated by the control unit, which also controls the flow control valves and the pump motor.

If the electricity supply is lost or a fault on the computer is detected, for safety, the proportional flow control valves 113, 114, 119 of the three circuits open and the connection member opens by means of elastic return means or a disengaging dog.

The invention claimed is:

1. A two-speed torque transmission device for a vehicle comprising at least one electric motor, the torque transmission device comprising:
   - a first clutch comprising a first input element capable of being driven by the electric motor, and a first output element, torque being transmitted between the first input element and the first output element when the first clutch is closed,
   - a second clutch comprising a second input element capable of being driven by the electric motor, and a second output element, torque being transmitted between the second input element and the second output element when the second clutch is closed,
   - a transmission member,
   - a first transmission mechanism arranged to transmit torque between the first output element and the transmission member, according to a first gear ratio, the first gear ratio being the slowest gear ratio of the torque transmission device,
   - a second transmission mechanism arranged to transmit torque between the second output element and the transmission member, according to a second gear ratio different from the first gear ratio, the second gear ratio being the fastest gear ratio of the torque transmission device,
   - a connection element arranged to permit or interrupt mutual rotational drive between the first output element of the first clutch and the transmission member, by the first transmission mechanism,
   - wherein the connection element is arranged to interact solely with the first transmission mechanism associated with the first gear ratio.

2. The torque transmission device as claimed in claim 1, wherein the first clutch and the second clutch are wet multi-disk clutches.

3. The torque transmission device as claimed in claim 1, wherein the connection element is arranged to permit the mutual rotational drive between the first output element of the first clutch and the transmission member, by the first transmission mechanism, when the first clutch is closed, and to interrupt the mutual rotational drive between the first output element of the first clutch and the transmission member, by the first transmission mechanism, when the first clutch is open.

4. The torque transmission device as claimed in claim 1, wherein the connection element is arranged so as to permit or interrupt the mutual drive between the transmission member and the first transmission mechanism.

5. The torque transmission device as claimed in claim 1, wherein the first transmission mechanism is a reduction gear and the first transmission mechanism has a lower gear ratio than the second transmission mechanism.

6. The torque transmission device as claimed in claim 1, wherein the second transmission mechanism is a reduction gear.

7. The torque transmission device as claimed in claim 1, wherein the first input element and the second input element are arranged to be driven by a common torque input shaft.

8. The torque transmission device as claimed in claim 1, wherein the first transmission mechanism comprises a first input shaft rigidly connected to a first toothed input wheel for rotation therewith, a first toothed output wheel meshing, directly or indirectly, with the first toothed input wheel, and wherein the second transmission mechanism comprises a second input shaft rigidly connected to a second toothed input wheel for rotation therewith, a second toothed output wheel meshing, directly or indirectly, with the second toothed input wheel.

9. The torque transmission device as claimed in claim 8, wherein the connection element is arranged to interact solely with the first toothed input wheel or the first toothed output wheel.

10. The torque transmission device as claimed in claim 8, wherein at least one of the first input shaft and the second input shaft is a hollow shaft and the other of the first input shaft and the second input shaft extends inside the hollow shaft.

11. The torque transmission device as claimed in claim 1, wherein the connection element is a synchronizer.

12. A torque transmission assembly comprising:
a torque transmission device as claimed in claim 1; and
a differential, the torque transmission device comprising an output member capable of rotating the differential.

13. The torque transmission assembly as claimed in claim 12, further comprising a parking brake mechanism including a toothed locking wheel mounted for conjoint rotation on the transmission member or on the differential or on a portion of the transmission device situated kinematically between the transmission member and the differential, the toothed locking wheel being associated with a controlled locking lever that can move between a locking position in which the controlled locking lever is engaged in the teeth of the toothed locking wheel so as to prevent the differential from being rotated, and a released position in which the controlled locking lever is disengaged from the teeth of the toothed locking wheel, so as to allow the differential to be rotated.

14. A torque transmission system comprising a torque transmission device as claimed in claim 7, wherein the common torque input shaft is an output shaft of the electric motor.

15. A method for actuating a vehicle torque transmission device as claimed in claim 1, the first clutch being of normally open type, the second clutch being of normally open type, and a the connection element being of the normally open type, the method comprising the following successive steps in a speed increase phase of the vehicle:
a) closing the first clutch and opening the second clutch in order to transmit torque via the first transmission mechanism having a first gear ratio, and closing the connection element,
b) keeping the first clutch closed and keeping the second clutch open in order to transmit torque via the first transmission mechanism having the first gear ratio, and keeping the connection element closed,
c) progressively opening the first clutch and progressively closing the second clutch in order to transmit torque via the second transmission mechanism having a second gear ratio,
d) opening the connection element in order to prevent the driving of the first output element of the first clutch by the transmission member, and
e) keeping the first clutch open and keeping the second clutch closed in order to transmit torque via the second transmission mechanism having the second gear ratio, while keeping the connection element open.

16. An actuation device for implementing the method claimed in claim 15, the actuation device comprising:
a pump with two outputs driven by a pump motor,
a first circuit for supplying actuation fluid to the first clutch of the normally open type of the transmission device, so as to actuate the first clutch,
a second circuit for supplying actuation fluid to the second clutch of the normally open type of the transmission device, so as to actuate the second clutch,
a third circuit for supplying actuation fluid to the connection element of the normally open type, so as to open the connection element when the first clutch is open, the third circuit and the first circuit being connected to one of the two outputs of the pump and the second circuit being connected to the other of the two outputs of the pump.

17. The torque transmission device as claimed in claim 2, wherein the connection element is arranged to permit the mutual rotational drive between the first output element of the first clutch and the transmission member, by the first transmission mechanism, when the first clutch is closed, and to interrupt the mutual rotational drive between the first output element of the first clutch and the transmission member, by the first transmission mechanism, when the first clutch is open.

18. The torque transmission device as claimed in claim 8, wherein in a first operating mode of the connection element, the first toothed output wheel is rigidly connected to the transmission member, and in a second operating mode of the connection element, the first toothed output wheel rotates relative to the transmission member.

* * * * *